(12) United States Patent
Gao et al.

(10) Patent No.: US 12,474,090 B2
(45) Date of Patent: Nov. 18, 2025

(54) SYSTEM FOR UTILIZING WASTE HEAT OF DATA CENTER

(71) Applicant: Beijing Youzhuju Network Technology Co., Ltd., Beijing (CN)

(72) Inventors: Bing Gao, Beijing (CN); Jian Wang, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/899,614

(22) Filed: Sep. 27, 2024

(65) Prior Publication Data

US 2025/0020365 A1    Jan. 16, 2025

Related U.S. Application Data

(63) Continuation of application No. PCT/CN2023/084873, filed on Mar. 29, 2023.

(30) Foreign Application Priority Data

Apr. 2, 2022    (CN) .......................... 202210351244.9

(51) Int. Cl.
*F24T 10/13* (2018.01)
*F24D 11/02* (2006.01)
(Continued)

(52) U.S. Cl.
CPC .......... *F24T 10/13* (2018.05); *F24D 11/0207* (2013.01); *F24T 50/00* (2018.05);
(Continued)

(58) Field of Classification Search
CPC .. F24D 11/0207; F24D 2200/11; F24F 10/13; F24F 50/00; F25B 30/06
See application file for complete search history.

(56) References Cited

U.S. PATENT DOCUMENTS

2017/0293330 A1    10/2017    Hardin

FOREIGN PATENT DOCUMENTS

| CN | 205299850 U | 6/2016 |
| CN | 207118211 U | 3/2018 |

(Continued)

OTHER PUBLICATIONS

International Search Report received for PCT Patent Application No. PCT/CN2023/084873, mailed on Jun. 15, 2023, 11 pages (3 pages of English Translation and 8 pages of Original Document).

(Continued)

*Primary Examiner* — Nael N Babaa

(57) ABSTRACT

A system for utilizing waste heat of data center, which includes a first heat exchange module, a second heat exchange module, a heat storage and extraction flow path, a heat supply flow path and a buried pipe; both the heat storage and extraction flow path and the heat supply flow path are connected with the first heat exchange module, the second heat exchange module is connected in the heat storage and extraction flow path and the heat supply flow path, the buried pipe is arranged in the heat storage and extraction flow path, and the buried pipe is configured to be buried below a ground surface and store the heat transferred by the data center heat dissipation system into soil below the ground surface, or transfer heat stored in the soil below the ground surface to the heat supply flow path through the second heat exchange module.

19 Claims, 4 Drawing Sheets

(51) Int. Cl.
F24T 50/00 (2018.01)
F25B 30/06 (2006.01)
F24T 10/00 (2018.01)

(52) U.S. Cl.
CPC .......... F25B 30/06 (2013.01); *F24D 2200/11* (2013.01); *F24T 2010/56* (2018.05)

(56) References Cited

FOREIGN PATENT DOCUMENTS

| | | | |
|---|---|---|---|
| CN | 108895715 | A | 11/2018 |
| CN | 208171343 | U | 11/2018 |
| CN | 109282338 | A | 1/2019 |
| CN | 110173932 | A | 8/2019 |
| CN | 212777726 | U | 3/2021 |
| CN | 113340143 | A | 9/2021 |
| CN | 113758343 | A | 12/2021 |
| CN | 114025573 | A | 2/2022 |
| CN | 114585240 | A | 6/2022 |
| CN | 114585240 | B | 9/2023 |
| JP | 2016-080310 | A | 5/2016 |
| WO | 2015/102170 | A1 | 7/2015 |

OTHER PUBLICATIONS

Notice of Allowance received from Chinese patent application No. 202210351244.9 mailed on Aug. 29, 2023, 7 pages (2 pages English Translation and 5 pages Original Copy).
Office action received from Chinese patent application No. 202210351244.9 mailed on Jun. 1, 2023, 8 pages (2 pages English Translation and 6 pages Original Copy).
European Search Report for EP Patent Application No. 23778326.1, Issued on Jun. 2, 2025, 7 pages.

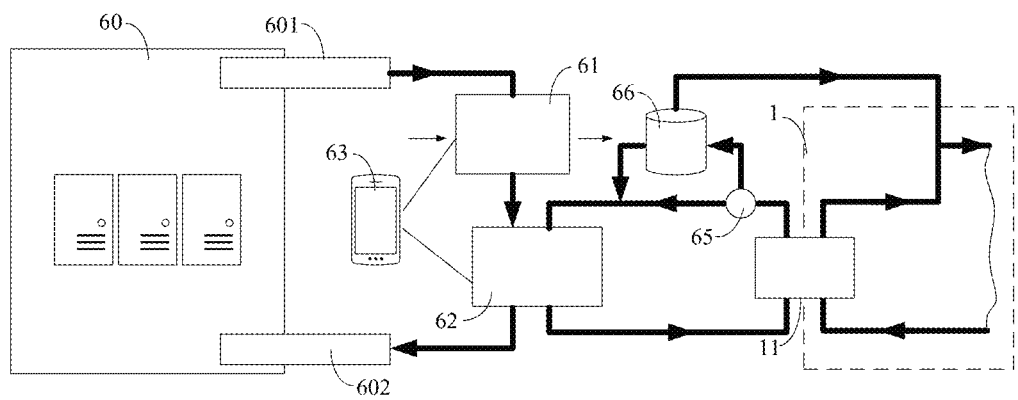

FIG. 8

| obtaining a heat supply demand of the system for utilizing waste heat of data center and temperature information of the cooling medium at the cooling medium outlet of the data center | S910 |

↓

| according to the heat supply demand of the system for utilizing waste heat of data center and the temperature information, controlling a heat exchanging ratio of the first heat exchanger and the second heat exchanger respectively by the first controller | S920 |

FIG. 9

SYSTEM FOR UTILIZING WASTE HEAT OF DATA CENTER

CROSS-REFERENCE TO RELATED APPLICATION

This application is a continuation of International Application No. PCT/CN2023/084873 filed on Mar. 29, 2023, which priority of the Chinese Patent Applications No. 202210351244.9, titled "system for utilizing waste heat of data center" and filed on Apr. 2, 2022, the disclosure of which is incorporated herein by reference in its entirety as part of the present application.

TECHNICAL FIELD

The present disclosure relates to the technical field of waste heat recovery and utilization, in particular to a system for utilizing waste heat of data center.

BACKGROUND

In order to respond to user requirements for the network, servers in existing data center usually need to operate uninterrupted throughout the year, during operation, the data center consumes a large amount of electricity and generates a large amount of waste heat which is usually dissipated through the data center dissipation system, and cannot be effectively utilized, resulting in a waste of energy. Because the data center consumes a large amount of electricity and generates a large amount of waste heat that is directly emitted into the atmosphere, the energy utilization rate is low, which is not conducive to reducing carbon emissions related to the operation of the data center.

SUMMARY

The purpose of the present disclosure is to provide a system for utilizing waste heat of data center, to solve the technical problems existing in related technologies.

In order to achieve the abovementioned purposes, the present disclosure provides a system for utilizing waste heat of data center, including a first heat exchange module, a second heat exchange module, a heat storage and extraction flow path, a heat supply flow path and a buried pipe;
- the first heat exchange module is configured to connect with a data center heat dissipation system for dissipating heat of a data center, both the heat storage and extraction flow path and the heat supply flow path are connected with the first heat exchange module, so that the first heat exchange module is capable of transferring heat generated by the data center and absorbed by the data center heat dissipation system to the heat supply flow path and/or the heat storage and extraction flow path;
- the second heat exchange module is connected in the heat storage and extraction flow path and the heat supply flow path, so that the heat storage and extraction flow path is capable of exchanging heat with the heat supply flow path;
- the buried pipe is arranged in the heat storage and extraction flow path, and the buried pipe is configured to be buried below a ground surface and store the heat transferred by the data center heat dissipation system to the heat storage and extraction flow path into soil below the ground surface, or transfer heat stored in the soil below the ground surface to the heat supply flow path through the second heat exchange module.

Optionally, the first heat exchange module comprises a first heat exchanger, a second heat exchanger, a third heat exchanger, a first flow path that is capable of being selectively opened or closed, and a second flow path that is capable of being selectively opened or closed;
- both a first inlet of the first heat exchanger and a first outlet of the first heat exchanger are configured to connect with the data center heat dissipation system, and a second outlet of the first heat exchanger is connected with a first inlet of the second heat exchanger through the first flow path, and the second outlet of the first heat exchanger is connected with a first inlet of the third heat exchanger through the second flow path; both a first outlet of the second heat exchanger and a first outlet of the third heat exchanger are connected with a second inlet of the first heat exchanger;
- both a second outlet of the second heat exchanger and a second inlet of the second heat exchanger are located in the heat storage and extraction flow path;
- both a second outlet of the third heat exchanger and a second inlet of the third heat exchanger are connected with the heat supply flow path.

Optionally, a first switching valve is arranged on the first flow path, and a second switching valve is arranged on the second flow path; or,
- the first heat exchange module further comprises a first three-port valve, and a port A of the first three-port valve is connected with the second outlet of the first heat exchanger, and a port B of the first three-port valve is connected with the first inlet of the second heat exchanger, a port C of the first three-port valve is connected with the first inlet of the third heat exchanger, and the first flow path is a flow path connecting the second outlet of the first heat exchanger, the port A of the first three-port valve, the port B of the first three-port valve and the first inlet of the second heat exchanger, the second flow path is a flow path connecting the second outlet of the first heat exchanger, the port A of the first three-port valve, the port C of the first three-port valve and the first inlet of the third heat exchanger.

Optionally, the first heat exchange module further comprises a first pump, the first pump is arranged on both the first flow path and the second flow path, or, both the first outlet of the second heat exchanger and the first outlet of the third heat exchanger are connected with an inlet of the first water pump, and an outlet of the first water pump is connected with the second inlet of the first heat exchanger.

Optionally, the heat storage and extraction flow path is further provided with a second water pump, the second heat exchange module comprises a fourth heat exchanger, and the fourth heat exchanger is simultaneously arranged on the heat storage and extraction flow path and the heat supply flow path, a first inlet of the fourth heat exchanger is connected with an outlet of the buried pipe, a first outlet of the fourth heat exchanger is connected with an inlet of the buried pipe, both a second inlet of the fourth heat exchanger and a second outlet of the fourth heat exchanger are connected with the heat supply flow path.

Optionally, the heat supply flow path comprises a first trunk path, a second trunk path, a first branch path that is capable of being selectively opened or closed, and a second branch path that is capable of being selectively opened or closed;

an outlet of the first trunk path is connected with the second inlet of the third heat exchanger through the first branch path, and the outlet of the first trunk path is connected with the second inlet of the fourth heat exchanger through the second branch path, both the second outlet of the third heat exchanger and the second outlet of the fourth heat exchanger are connected with an inlet of the second trunk path.

Optionally, a third switching valve is arranged in the first branch path, and a fourth switching valve is arranged in the second branch path; or, the heat supply flow path is provided with a second three-port valve, a port A of the second three-port valve is connected with the outlet of the first trunk path, a port B of the second three-port valve is connected with the second inlet of the third heat exchanger, a port C of the second three-port valve is connected with the second inlet of the fourth heat exchanger, and the first branch path is a branch path connecting the outlet of the first trunk path, the port A of the second three-port valve, the port B of the second three-port valve and the second inlet of the third heat exchanger, the second branch path is a branch path connecting the outlet of the first trunk path, the port A of the second three-port valve, the port C of the second three-port valve and the second inlet of the fourth heat exchanger.

Optionally, the system for utilizing waste heat of data center further comprises at least two temperature sensors, the at least two temperature sensors are configured to be buried in the soil outside the buried pipe and for detecting a temperature of the soil, distances between the at least two temperature sensors and a buried region where the buried pipe is located are different.

Optionally, the buried pipe is constructed as a U-shaped heat exchanging pipe extending in a depth direction of the soil.

Optionally, a plurality of buried pipes are provided, and the plurality of buried pipes are connected in series or in parallel with each other in the heat storage and extraction flow path.

Optionally, the buried pipe is buried at a position greater than or equal to 200 meters and less than or equal to 300 meters below the ground surface.

Optionally, the heat supply flow path is a flow path configured for connecting with a municipal heat supply network, or, the heat supply flow path is a flow path in the municipal heat supply network.

BRIEF DESCRIPTION OF DRAWINGS

The accompanying drawings are provided to provide a further understanding of the present disclosure and constitute a part of the specification, and together with the following detailed description, serve to explain the present disclosure, but do not constitute a limitation of the present disclosure. In the accompanying drawings:

FIG. 8 is a flow path schematic diagram of a data center heat dissipation system provided by another exemplary embodiment of the present disclosure;

FIG. 9 is a flow chart of a heat dissipation method provided by an exemplary embodiment of the present disclosure.

EXPLANATION OF REFERENCE SIGNS

Figure 1:
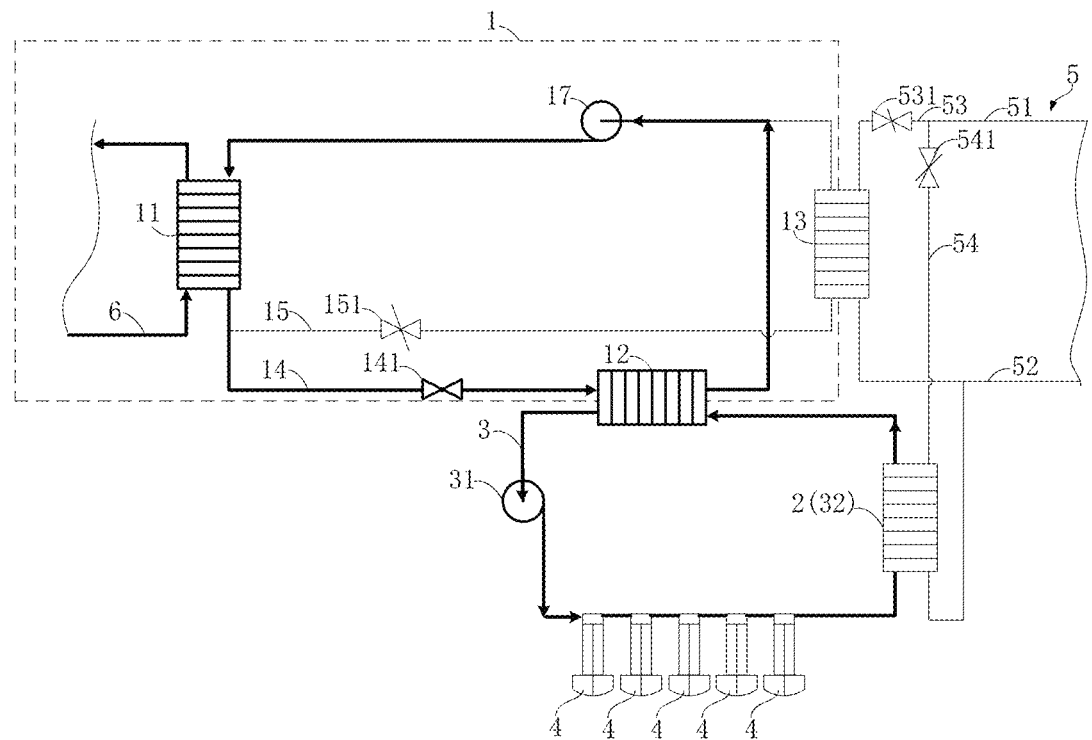
FIG. 1 is a flow path schematic diagram of a system for utilizing waste heat of data center provided by an exemplary embodiment of the present disclosure, in which the system for utilizing waste heat of data center is in a heat storage mode.

1—first heat exchange module; 11—first heat exchanger; 12—second heat exchanger; 13—third heat exchanger; 14—first flow path; 141—first switching valve; 15—second flow path; 151—second switching valve; 16—first three-port valve; 17—first water pump; 2—second heat exchange module; 3—heat storage and extraction flow path; 31—second water pump; 32—fourth heat exchanger; 4—buried pipe; 5—heat supply flow path; 51—first trunk path; 52—second trunk path; 53—first branch path; 531—third switching valve; 54—second branch path; 541—fourth switching valve; 55—second three-port valve; 6—data center heat dissipation system; 60—data center; 601—cooling medium outlet; 602—cooling medium inlet; 61—first data center heat exchanger; 62—second data center heat exchanger; 621—evaporator; 622—compressor; 623—condenser; 624—throttle valve; 63—first controller; 64—cooling tower; 65—three-port valve; 66—phase changing heat storage water tank; 7—temperature sensor; 71—first temperature sensor; 72—second temperature sensor; 73—third temperature sensor.

DETAILED DESCRIPTION

Hereinafter, specific embodiments of the present disclosure will be described in detail with reference to the accompanying drawings. It should be understood that the specific embodiments described herein are only used to illustrate and explain the present disclosure, and are not used to limit the present disclosure.

In the present disclosure, it should be noted that terms such as "first" and "second" are used to distinguish one element from another, and they are not sequential or important. In addition, in the description with reference to the drawings, the same reference numerals in different drawings indicate the same elements.

As illustrated in FIG. 1 to FIG. 9, the present disclosure provides a system for utilizing waste heat of data center, the system for utilizing waste heat of data center includes a first heat exchange module 1, a second heat exchange module 2, a heat storage and extraction flow path 3, a heat supply flow path 5 and a buried pipe 4. Among them, the first heat exchange module 1 is configured to connect with the data center heat dissipation system 6 for dissipating heat of a data center 60, and both the heat storage and extraction flow path 3 and the heat supply flow path 5 are connected with the first heat exchange module 1, so that the first heat exchange module 1 is capable of transferring heat generated by the data center 60 and absorbed by the data center heat dissipation system 6 to the heat supply flow path 5 and/or the heat storage and extraction flow path 3. The second heat exchange module 2 is connected in the heat storage and extraction flow path 3 and the heat supply flow path 5, so that the heat storage and extraction flow path 3 is capable of exchanging heat with the heat supply flow path 5. The buried pipe 4 is arranged in the heat storage and extraction flow path 3, and the buried pipe 4 is configured to be buried below a ground surface and store the heat transferred by the data center heat dissipation system 6 to the heat storage and extraction flow path 3 into soil below the ground surface, or transfer heat stored in the soil below the ground surface to the heat supply flow path 5 through the second heat exchange module 2.

The above-mentioned system for utilizing waste heat of data center can have a first heat supply mode, the heat of the data center 60 absorbed by the data center heat dissipation system 6 can be transferred to the heat supply flow path 5 through the first heat exchange module 1, the heat supply flow path 5 can use the heat of the data center 60 to provide heat (such as heat supply or hot water supply) for other places (such as residential region, office building or shopping mall), and the heat generated during the operation of the data center 60 can be recycled and reused, thereby avoiding the waste of energy.

The system for utilizing waste heat of data center can further have a heat storage mode, the data center heat dissipation system 6 is capable of transferring the heat absorbed from the data center 60 to the heat storage and extraction flow path 3 through the first heat exchange module 1, and the heat of the data center 60 can be transferred to the soil through the buried pipe 4 buried below the ground surface. Because the soil layer is a good heat storage medium, and its volume specific heat capacity is usually around 3.0 kj/m$^3$*K, which can play a good heat storage role. Therefore, in the case where no demand exists for the heat supply or the heat generated by the data center 60 is larger than a heat supply demand, the heat of the data center 60 can be stored in the soil below the ground surface through the heat storage and extraction flow path 3 to avoid energy waste.

The system for utilizing waste heat of data center further have a second heat supply mode, in the case where the heat supply flow path 5 has a heat supply demand, the heat storage and extraction flow path 3 can perform heat exchanging with the soil through the buried pipe 4, and cooling medium in the heat storage and extraction flow path 3 can obtain the heat stored in the soil, and transfer the heat to the heat supply flow path 5 through the second heat exchange module 2, thereby realizing an acquisition and utilization of the heat in the soil. The heat can be stored and taken out through the heat storage and extraction flow path 3, thereby flexibly meeting different heat supply demands of the heat supply flow path 5.

As an implementation scenario, the above-mentioned system for utilizing waste heat of data center can meet the time difference of the heating demand of the heat supply flow path 5, in the case where the heat supply flow path 5 is configured to provide heat or hot water for a residential region or a building, because the high temperature in summer, the heat supply flow path 5 has a small heat supply demand or no heat supply demand, the system for utilizing waste heat of data center can be in the heat storage mode, and the heat generated by the data center 60 can be transferred to the heat storage and extraction flow path 3 through the first heat exchange module 1, and stored in the soil below the ground surface through the buried pipe 4. In the case where the heat supply flow path 5 has a heat supply demand in winter, the system for utilizing waste heat of data center can be in the first heat supply mode, in the first heat supply mode, the heat of the data center 60 absorbed by the data center heat dissipation system 6 can be directly transferred to the heat supply flow path 5 through the first heat exchange module 1, the heat supply flow path 5 uses the heat of the data center 60 to provide heat (such as heat supply or hot water supply) for other places (such as residential region, office building or shopping mall). Alternatively, the system for utilizing waste heat of data center can further be in the second heat supply mode, in the second heat supply mode, the heat storage and extraction flow path 3 can transfer the heat stored in the soil to the heat supply flow path 5 for heat supply, which solves the time conflict between the heat generated by the data center 60 and the heat supply demand. In addition, the system for utilizing waste heat of data center can be in the first heat supply mode and the second heat supply mode at the same time.

Through the above-mentioned technical solution, the system for utilizing waste heat of data center can directly transfer the heat of the data center 60 to the heat supply flow path 5 through the first heat exchange module 1 to realize a reuse of the heat, and the heat of the data center 60 can further be stored in the soil below the ground surface through the heat storage and extraction flow path 3, in the case where a demand for heat supply exists, the heat in the soil is transferred to the heat supply flow path 5 to realize the storage and extraction of the heat, and the time conflict between the heat generated by the data center and the heat supply demand, so as to make full use of the heat, avoid the waste of energy, and help to achieve "carbon emission peak and carbon neutrality".

The above-mentioned heat supply flow path 5 can be a flow path configured to provide heat and/or hot water for buildings such as the residential regions, the office buildings, or the shopping malls, or it can further be a flow path configured to provide heat for industrial activities such as processing and production, the present disclosure does not limit the specific composition and functions of the heat supply flow path 5. Alternatively, the heat supply flow path 5 can be a flow path configured to connect with the municipal heat supply pipe network, or the heat supply flow path 5 can be a flow path of the municipal heating pipe network, the heat can be transferred to buildings or sites at different locations or distances through the municipal heating pipe network. Because the municipal heating pipe network is an existing pipe and is fully distributed, it can increase the range and distance of heat supply, save the cost of laying pipes, and simultaneously reduce installation region restrictions of the data center heat dissipation system 6 and the heat storage and extraction flow path 3, allow the data center heat dissipation system 6 and the heat storage and extraction flow path 3 to be installed at a location far away from the heat supply region such as a suburb, thereby reducing the land use cost of the data center heat dissipation system 6 and the heat storage and extraction flow path 3.

The heat storage and extraction flow path 3 transfers heat to the soil below the ground surface through the buried pipe 4 or obtains heat from the soil, in order to improve the heat exchanging efficiency between the buried pipe 4 and the soil, optionally, the buried pipe 4 can be constructed as a U-shaped heat exchanging pipe extending in the depth direction of the soil, among the buried pipes 4 with the same length, the overall volume of the buried pipe 4 formed as the U-shaped heat exchanging pipe is relatively small, and the contact area between the U-shaped heat exchanging pipe and the soil is large, and the heat exchanging efficiency of the U-shaped heat exchanging pipe is high. Moreover, because the U-shaped heat exchanging pipe extends in the depth direction of the soil, in the case of installing the U-shaped heat exchanging pipe, it only needs to drill the well in the depth direction of the soil, arrange the U-shaped heat exchanging pipe into the well, and then seal the well with the soil. The operation difficulty of the installing process is low and the workload is small, which can save installation costs.

Optionally, a plurality of buried pipes 4 can be provided, the plurality of buried pipes 4 are connected in series or in parallel with each other in the heat storage and extraction flow path 3, and the plurality of buried pipes 4 are capable of exchanging heat with the soil at the same time, which has a high heat exchanging efficiency.

The greater the distance between the buried pipe 4 and the ground surface, the smaller the amount of heat loss through the ground surface, and the higher the heat storage efficiency of the soil, however, at the same time, the cost of installing the buried pipe 4 is higher. In order to achieve a balance between heat storage efficiency and cost, optionally, the buried pipe 4 can be buried 200 meters to 300 meters below the ground surface (for example, 200 meters or 300 meters), and in the case where the buried pipe 4 is buried within this depth range, not only the soil's heat storage efficiency can be met and the amount of heat loss through the ground surface can be reduced, but also cost waste caused by too large installation project can be avoided.

As illustrated in FIG. 1 to FIG. 4, optionally, the first heat exchange module 1 can include a first heat exchanger 11, a second heat exchanger 12, a third heat exchanger 13, a first flow path 14 that is capable of being selectively opened or closed and a second flow path 15 that is capable of being selectively opened or closed. Both a first inlet of the first heat exchanger 11 and a first outlet of the first heat exchanger 11 are configured to be connected with the data center heat dissipation system 6, and a second outlet of the first heat exchanger 11 is connected with the first inlet of the second heat exchanger 12 through the first flow path 14, and the second outlet of the first heat exchanger 11 is connected with the first inlet of the third heat exchanger 13 through the second flow path 15; both an outlet of the second heat exchanger 12 and a first outlet of the third heat exchanger 13 are connected with the second inlet of the first heat exchanger 11. Both a second outlet of the second heat exchanger 12 and a second inlet of the second heat exchanger 12 are located on the heat storage flow path 3. Both a second outlet of the third heat exchanger 13 and a second inlet of the third heat exchanger 13 are connected with the heat supply flow path 5.

Figure 2:
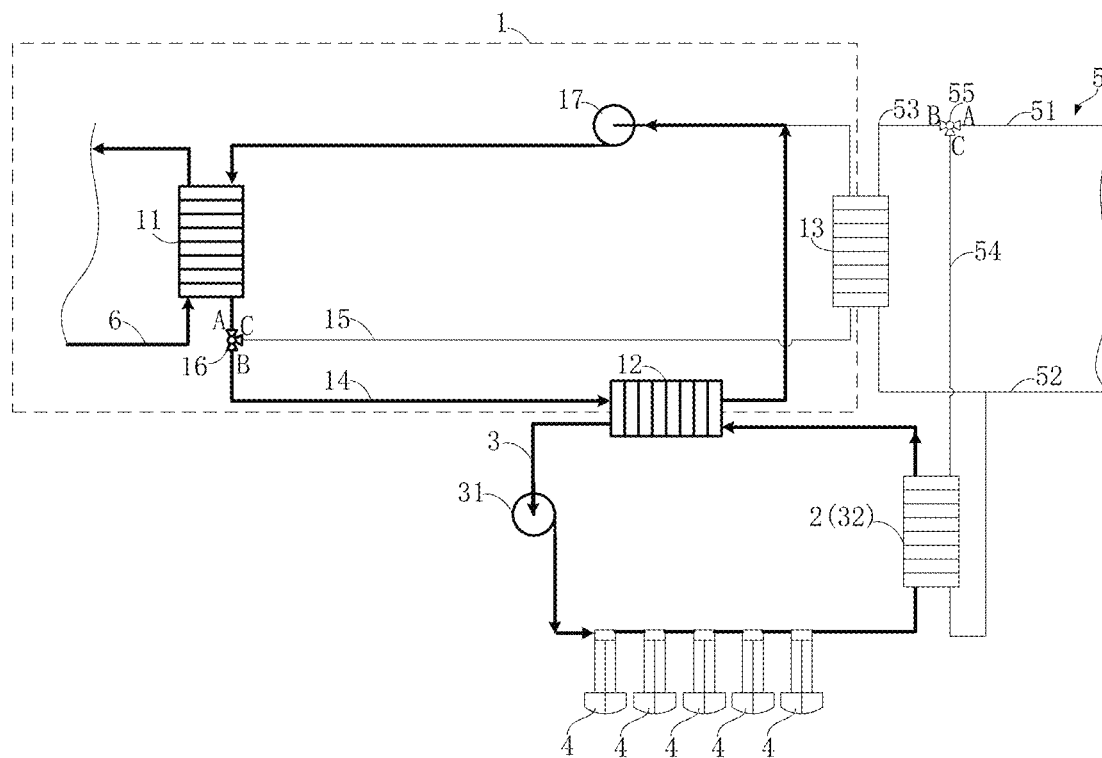
FIG. 2 is a flow path schematic diagram of a system for utilizing waste heat of data center provided by another exemplary embodiment of the present disclosure, in which the system for utilizing waste heat of data center is in a heat storage mode.

In the above-mentioned embodiment, in the case where the system for utilizing waste heat of data center is in the heat storage mode, as illustrated in FIG. 1 or FIG. 2, the first flow path 14 is opened and the second flow path 15 is closed, at this time, the first heat exchanger 11, the first flow path 14 and the second heat exchanger 12 form a loop, cooling medium in the first heat exchange module 1 exchanges heat with the cooling medium of the data center heat dissipation system 6 in the first heat exchanger 11, the high-temperature cooling medium that has obtained heat in the heat exchange module 1 flows through the second heat exchanger 12 through the first flow path 14, and exchanges heat in the second heat exchanger 12 with the low-temperature cooling medium in the heat storage and extraction flow path 3, thereby transferring the heat of the data center to the low-temperature cooling medium in the heat storage and extraction flow path 3, the high-temperature cooling medium that obtains heat in the heat storage and extraction flow path 3 flows through the buried pipe 4, and transfers the heat to the soil below the ground surface through the buried pipe 4, thereby storing the heat.

Figure 3:
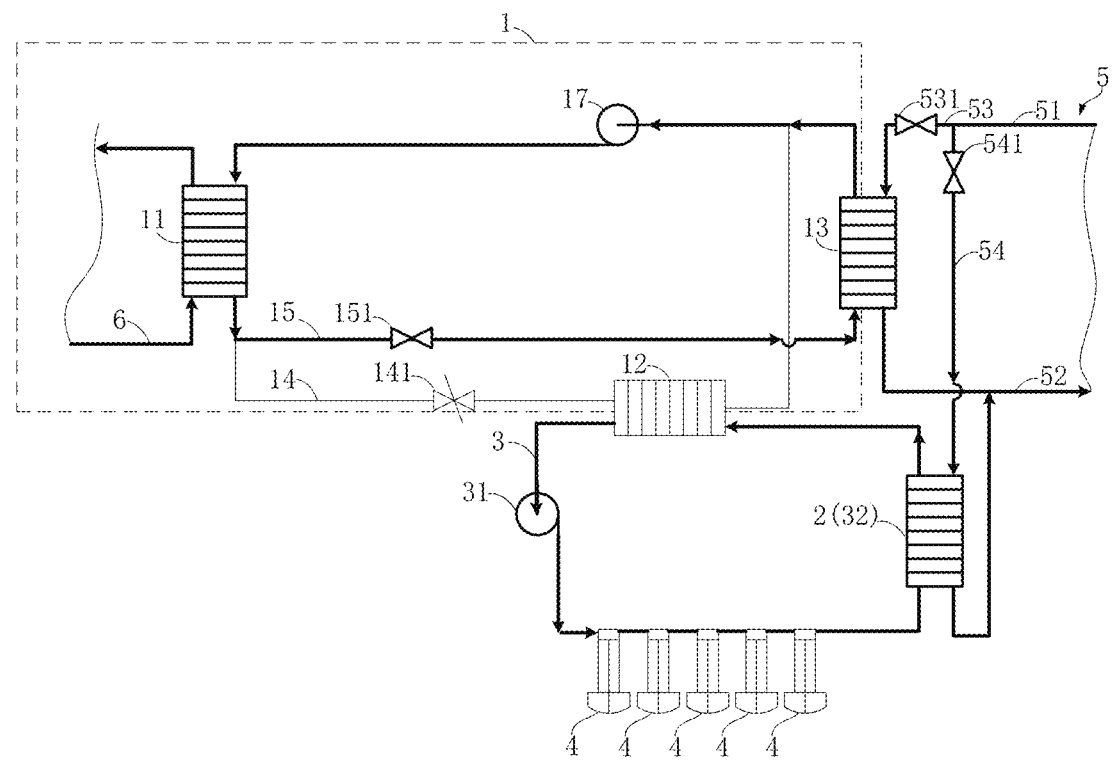
FIG. 3 is a flow path schematic diagram of a system for utilizing waste heat of data center provided by an exemplary embodiment of the present disclosure, in which the system for utilizing waste heat of data center is in a first heat supply mode and a second heat supply mode.
Figure 4:
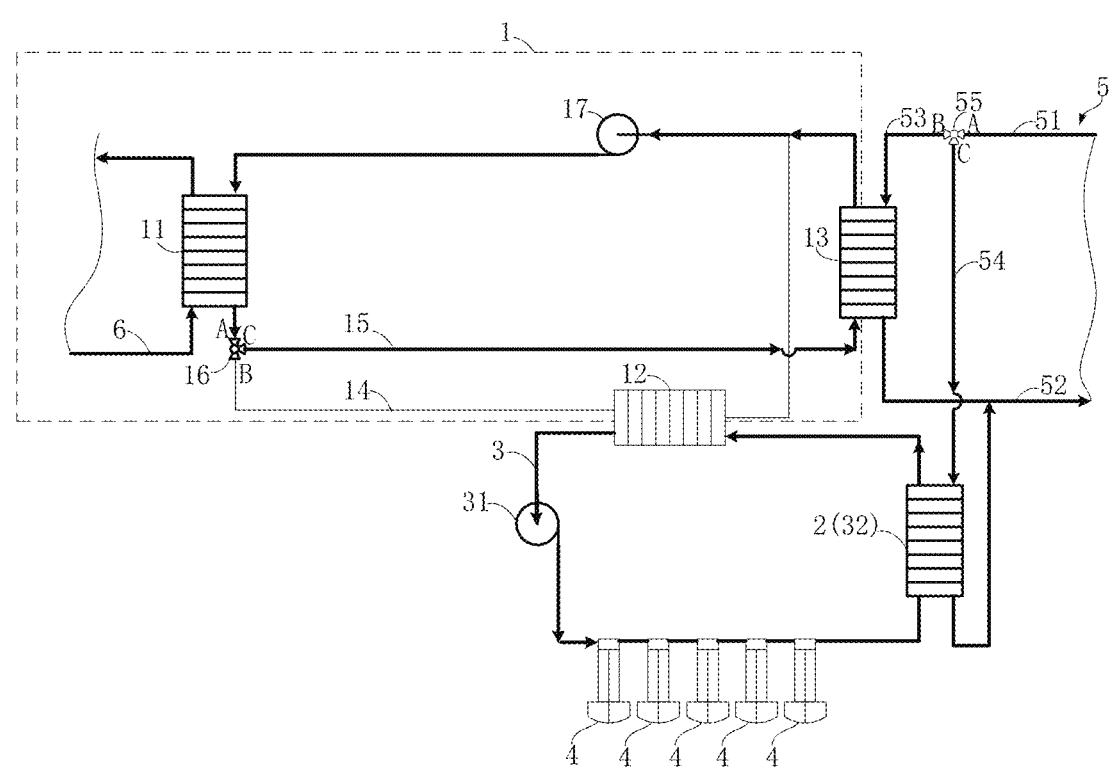
FIG. 4 is a flow path schematic diagram of a system for utilizing waste heat of data center provided by another exemplary embodiment of the present disclosure, in which the system for utilizing waste heat of data center is in a first heat supply and a second heat supply mode.

In the case where the system for utilizing waste heat of data center is in the first heat supply mode, as illustrated in FIG. 3 or FIG. 4, the first flow path 14 is turned off and the second flow path 15 is opened, at this time, the first heat exchanger 11, the second flow path 15 and the third heat exchanger 13 form a loop, the cooling medium in the first heat exchange module 1 exchanges heat with the cooling medium of the data center heat dissipation system 6 in the first heat exchanger 11, the cooling medium in the first heat exchange module 1 becomes high-temperature cooling medium after obtaining heat, and flows through the third heat exchanger 13 through the second flow path 15, the high-temperature cooling medium in the first heat exchange module 1 transfers heat to the low-temperature cooling medium in the heat supply flow path 5 through the third heat exchanger 13 to realize the transferring and utilization of the heat.

In the case where the system for utilizing waste heat of data center is in the second heat supply mode, as illustrated in FIG. 3 or FIG. 4, the first flow path 14 is turned off, the cooling medium in the first flow path 14 does not circulate, and the cooling medium of the heat storage and extraction flow path 3 does not exchange heat with the cooling medium in the first flow path 14 when passing through the second heat exchanger 12. The low-temperature cooling medium in the heat storage and extraction flow path 3 is capable of exchanging heat with the soil when flowing through the buried pipe 4, thereby absorbing the heat in the soil and becoming the high-temperature cooling medium, the high-temperature cooling medium in the heat storage and extraction flow path 3 transfers the heat to the low-temperature cooling medium in the heat supply flow path 5, thereby realizing the reuse of heat stored in the soil, improving the utilization rate of the heat, and meeting the heat supply demand.

Among them, the above-mentioned system for utilizing waste heat of data center can be in the first heat supply mode or the second heat supply mode alone, or it can be in the first heat supply mode and the second heat supply mode simultaneously, that is, both the heat generated by the data center and the heat stored in the soil can be used for heat supply at the same time. In order to improve the overall heat utilization rate, during the planning and design stage of the system for utilizing waste heat of data center, the maximum heat supply demand of the heat supply flow path 5 can be set to be greater than or equal to a waste heat generation amount of the data center 60, thereby ensuring that the heat of the data center 60 can all be used in the heat supply flow path 5, thereby avoiding excessive heat in the data center 60 being continuously stored in the soil through the heat storage and extraction flow path 3 and causing a waste of energy, which is helpful to achieve "carbon emission peak and carbon neutrality".

Optionally, the flow path in the first heat exchange module 1 can be a flow path in the municipal pipe network, that is, the data center heat dissipation system 6 exchanges heat with the flow path in the municipal pipe network through the first heat exchanger 11, and transfer the heat to the heat supply flow path 5 or the heat storage flow path 3 through the flow path of the municipal pipe network, the flow path in the municipal pipe network is an existing flow path, which is with comprehensive distribution coverage and can be used for long-distance transmission, in the case where the distance between the data center heat dissipation system 6, the heat supply flow path 5, and the heat storage and extraction flow path 3 is relatively long, the municipal pipe network can realize the long-distance heat transmission, save the cost of laying pipes, and achieve spatial allocation of heat.

In order to achieve selectively opening or closing the first flow path 14 and the second flow path 15, as an exemplary embodiment, as illustrated in FIG. 1 and FIG. 3, the first flow path 14 is provide with a first switching valve 141, the second flow path 15 is provided with a second switching valve 151.

As another exemplary embodiment, as illustrated in FIG. 2 and FIG. 4, the first heat exchange module 1 may further include a first three-port valve 16, and a port A of the first three-port valve 16 is connected with the second outlet of the first heat exchanger 11, a port B of the first three-port valve 16 is connected with the first inlet of the second heat exchanger 12, and a port C of the first three-port valve 16 is connected with the first inlet of the third heat exchanger 13, the first flow path 14 is a flow path connecting the second outlet of the first heat exchanger 11, the port A of the first three-port valve 16, the port B of the first three-port valve 16 and the first inlet of the second heat exchanger 12, the second flow path 15 is a flow path connecting the second outlet of the first heat exchanger 11, the port A of the first three-port valve 16, the port C of the first three-port valve 16 and the first inlet of the third heat exchanger 13.

In the above-mentioned embodiment, in the case where the system for utilizing waste heat of data center is in the heat storage mode, the port A and the port B of the first three-port valve 16 are turned on, the port C of the first three-port valve 16 is turned off, and the first heat exchanger 11 is connected with the first flow path 14. In the case where the system for utilizing waste heat of data center is in the first heat supply mode or the second heat supply mode, the port A and the port C of the first three-port valve 16 are turned on, the port B is turned off, and the first heat exchanger 11 is connected with the second flow path 15.

The cooling medium in the first heat exchange module 1 can be refrigerant or cooling water, in order to realize circulate flowing of the cooling medium in the first heat exchange module 1, optionally, the first heat exchange module 1 can further include a first water pump 17, the first flow path 14 and the second flow path 15 can both be provided with the first water pump 17; or, both the first outlet of the second heat exchanger 12 and the first outlet of the third heat exchanger 13 are connected with the inlet of the water pump 17, and the outlet of the first water pump 17 is connected with the second inlet of the first heat exchanger 11.

The cooling medium in the heat storage and extraction flow path 3 can be refrigerant or cooling water, in order to realize circulate flowing of the cooling medium in the heat storage and extraction flow path 3, optionally, the heat storage and extraction flow path 3 can further be provided with a second water pump 31, and the second heat exchange module 2 may further include a fourth heat exchanger 32, which is disposed in both the heat storage and extraction flow path 3 and the heat supply flow path 5, a first inlet of the fourth heat exchanger 32 is connected with the outlet of the buried pipe 4, a first outlet of the fourth heat exchanger 32 is connected with an inlet of the buried pipe 4, and both the second inlet of the fourth heat exchanger 32 and the second outlet of the fourth heat exchanger 32 are connected with the heat supply flow path 5. In the case where the system for utilizing waste heat of data center is in the second heat supply mode, the cooling medium in the heat storage and extraction flow path 3 can obtain the heat in the soil, and transfer the heat to the cooling medium of the heat supply flow path 5 through the fourth heat exchanger 32, thereby achieving heat transferring.

The heat supply flow path 5 can obtain heat from the data center heat dissipation system 6 through the first heat exchange module 1, and can further obtain heat from the heat storage and extraction flow path 3 through the second heat exchange module 2, in order to achieve the heat control of the heat supply flow path 5, alternatively, the heat supply flow path 5 may include a first trunk path 51, a second trunk path 52, a first branch path 53 that is capable of being selectively opened or closed, and a second branch path 54 that is capable of being selectively opened or closed. The outlet of the first trunk path 51 is connected with the second inlet of the third heat exchanger 13 through the first branch path 53, the outlet of the first trunk path 51 is connected with the second inlet of the fourth heat exchanger 32 through the second branch path 54, and both the second outlet of the third heat exchanger 13 and the second outlet of the fourth heat exchanger 32 are connected with the inlet of the second trunk path 52.

In the case where the system for utilizing waste heat of data center is in the first heat supply mode, the first trunk path 51, the first branch path 53, the third heat exchanger 13 and the second trunk path 52 are opened to form a loop, in the case where the system for utilizing waste heat of data center is in the second heat supply mode, the first trunk path 51, the second branch path 54, the fourth heat exchanger 32 and the second trunk path 52 are opened to form a loop. Among them, the first branch path 53 and the second branch path 54 is capable of being opened separately or simultaneously.

In order to achieve selectively opening or closing the first branch path 53 and the second branch 54, as an exemplary implementation, the first branch path 53 can be provided with a third switching valve 531, and the second branch 54 can be provided with a fourth switching valve 541, as illustrated in FIG. 1 or FIG. 3.

As another exemplary embodiment, a second three-port valve 55 may be provided on the heat supply flow path 5, a port A of the second three-port valve 55 is connected with the outlet of the first trunk path 51, a port B of the second three-port valve 55 is connected with the second inlet of the third heat exchanger 13, a port C of the second three-port valve 55 is connected with the second inlet of the fourth heat exchanger 32, the first branch path 53 is a branch path connecting the outlet of the first trunk path 51, the port A of the second three-port valve 55, the port B of the second three-port valve 55 and the second inlet of the third heat exchanger 13, and the second branch path 54 is a branch path connecting the outlet of the first trunk path 51, the port A of the second three-port valve 55, the port C of the second three-port valve 55, and the second inlet of the fourth heat exchanger 32, as illustrated in FIG. 2 or FIG. 4.

In the above-mentioned embodiment, in the case where the system for utilizing waste heat of data center is only in the first heat supply mode, the port A and the port B of the second three-port valve 55 are opened and the port C of the second three-port valve 55 is closed. In the case where the system for utilizing waste heat of data center is only in the second heat supply mode, the port A and the port C of the second three-port valve 55 are opened and the port B of the second three-port valve 55 is closed. In the case where the system for utilizing waste heat of data center is in the first heat supply mode and the second heat supply mode simultaneously, the port A, the port B and the port C of the second three-port valve 55 are all opened.

Figure 5:
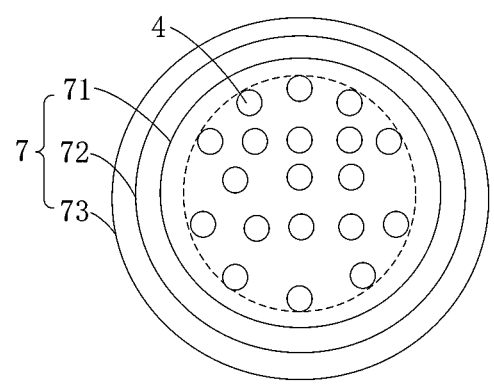
FIG. 5 is a top view of a buried pipe and temperature sensors of a system for utilizing waste heat of data center provided by an exemplary embodiment of the present disclosure.

In order to detect the heat exchanging efficiency between the buried pipe 4 and the soil, the thermal efficiency of the system for utilizing waste heat of data center is controlled, as illustrated in FIG. 5, optionally, the system for utilizing waste heat of data center can further include at least two temperature sensors 7, the temperature sensor 7 is configured to be buried in the soil outside the buried pipe 4 to detect the temperature of the soil, and distances between at least two temperature sensors 7 and a buried region where the buried pipes 4 are located are different.

Among them, the above-mentioned buried region of the buried pipes 4 refers to the sum of the region used for burying all the buried pipes 4, and the distance between the temperature sensor 7 and the buried region where the buried pipes 4 are located refers to a straight-line distance between the temperature sensor 7 and the buried region. By at least two temperature sensors 7, the heat exchanged between the buried pipe 4 and the soil at different distances can be detected, the heat exchanging efficiency between the buried pipe 4 and the soil can be determined, the heat exchanging efficiency between the data center heat dissipation system 6 and heat storage and extraction flow path 3 can be adjusted, or the heat exchanging efficiency between the heat storage and extraction flow path 3 and the heat supply flow path 5 can be adjusted, thereby ensuring that the heat in the data center can be effectively stored or utilized.

The above-mentioned temperature sensors 7 can be buried at a plurality of temperature detection points in the soil, or can be buried at an annular temperature detection line circle around the buried region where the buried pipes 4 are located, the specific composition of the temperature sensor 7 is not limited by the present disclosure.

As an exemplary application scenario, as illustrated in FIG. 5, the system for utilizing waste heat of data center may include a first temperature sensor 71, a second temperature sensor 72 and a third temperature sensor 73 laid around the buried region where the buried pipes 4 are located, and the distances between the first temperature sensor 71, the second temperature sensor 72 and the third temperature sensor 73 with the buried region where the buried pipes 4 are located gradually increase.

In the case where the system for utilizing waste heat of data center is in the heat storage mode, the buried pipe 4 transfers heat to the soil, which causes the temperature of the soil around the buried pipe 4 to gradually increase, in the case where the temperature of the first temperature sensor 71 approaches a first upper temperature limit, and the temperature of the second temperature sensor 72 is much smaller than a second upper temperature limit, which means that the heat exchanging efficiency between the buried pipe 4 and the soil is too large, resulting in no time for heat to be transferred to the soil far away, and in this case, the heat exchanging between the buried pipe 4 and the soil can be paused or decreased, and the heat storage efficiency can be adjusted.

In the case where the system for utilizing waste heat of data center is in the second heat supply mode, the buried pipe 4 absorbs the heat stored in the soil, causing the temperature of the soil around the buried pipe 4 to gradually decrease, in the case where the second temperature sensor 72 approaches a second lower temperature limit, and the third temperature sensor 73 is much greater than a third lower temperature limit, which means that the efficiency of the buried pipe 4 in absorbing heat of the soil is too high, resulting in no time for the heat of the soil far away to be transferred to the soil close to the buried pipe 4, and in this case, the efficiency of the buried pipe 4 in absorbing the heat stored in the soil can be paused or decreased, and the soil far away can be allowed to transfer heat to the soil close to the buried pipe 4, thereby improving the utilization of heat in the soil.

The data center heat dissipation system 6 can recover the heat generated by the data center 60 and transfer the heat to the heat supply flow path 5 and/or the heat storage and extraction flow path 3 through the first heat exchange module 1, and the structures of the data center heat dissipation system 6 that can achieve the above functions can be varied.

Figure 6:
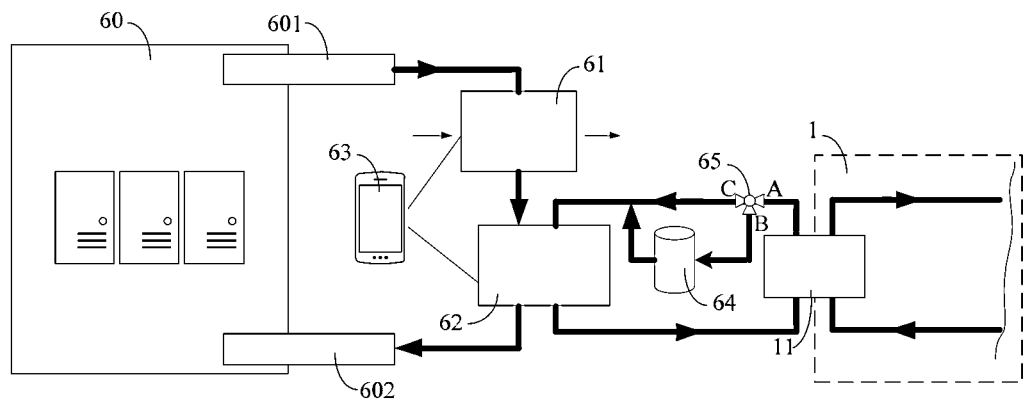
FIG. 6 is a flow path schematic diagram of a data center heat dissipation system provided by an exemplary embodiment of the present disclosure.

As illustrated in FIG. 6, as an exemplary implementation, the above-mentioned data center heat dissipation system 6 may include a first data center heat exchanger 61, a second data center heat exchanger 62 and a first controller 63. Among them, the first data center heat exchanger 61 and the second data center heat exchanger 62 are configured to form a first cooling loop with a cooling medium outlet 601 of the data center 60 and a cooling medium inlet 602 of the data center 60, so that the cooling medium of the data center 60 can flow through the cooling medium outlet 601, the first data center heat exchanger 61, the second data center heat exchanger 62 and the cooling medium inlet 602 of the data center 60 in sequence, and the first data center heat exchanger 61 can perform the first cooling on the cooling medium of the data center 60; the second data center heat exchanger 62 and the first heat exchange module 1 form a second cooling loop, so that the second data center heat exchanger 62 can performs a second cooling on the cooling medium in the first cooling loop according to the cooling medium in the second cooling loop; the first heat exchange module 1 can exchange the heat absorbed by the cooling medium in the second cooling loop to the heat supply flow path 5 and/or heat storage and extraction flow path 3. The first controller 63 is connected with the first data center heat exchanger 61 and the second data center heat exchanger 62, and the first controller 63 can be configured to control a heat transferring ratio between the first data center heat exchanger 61 and the second data center heat exchanger 62.

In the above-mentioned data center heat dissipation system 6, the cooling medium of the data center 60 can take away the heat generated by the data center 60 during operation, and performs the first heat exchanging and cooling through the first data center heat exchanger 61 to obtain the cooling medium of a first temperature, which then passes through the second data center heat exchanger 62 for a second heat exchanging and cooling to obtain the cooling medium of a second temperature, here, the second temperature is lower than the first temperature, which means that the heat exchanging and cooling are performed twice on the cooling medium coming out of the data center 60, so that the temperature of the cooling medium coming out of the data center 60 can reach a data center usage condition after the heat exchanging and cooling twice, and then the cooling medium of the second temperature can be passed into the data center 60 from the cooling medium inlet 602 of the data center 60 to take away the heat generated by the data center 60 and avoid functional damage caused by excessive temperature of the data center 60. Moreover, the heat dissipation ratio in the two heat dissipation and cooling processes mentioned above is adjustable and controllable, in the case where the heat exchanging efficiency between the data center heat dissipation system 6 and the system for utilizing waste heat of data center fluctuates, the heat dissipation ratio of the two heat dissipation and cooling processes can be adjusted, the heat exchange efficiency of the system of utilizing waste heat of the data center can be satisfied while ensuring the reliable and continuous heat dissipation requirements of the data center, and the recycling and reuse of waste heat can be realized, thereby avoiding the waste of energy and helping to achieve "carbon emission peak and carbon neutrality".

Figure 7:
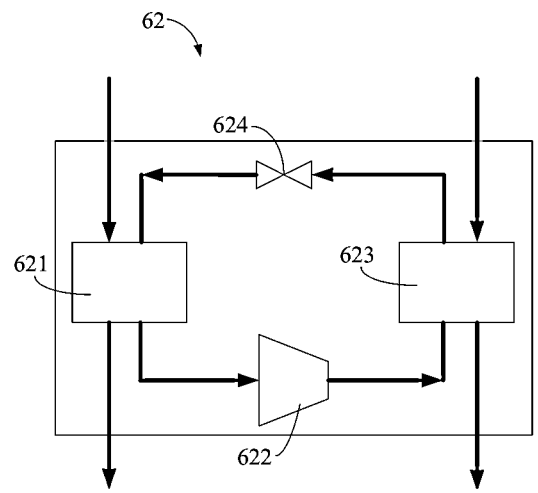
FIG. 7 is a flow path schematic diagram of a second data center heat exchanger of a data center heat dissipation system provided by an exemplary embodiment of the present disclosure.

As illustrated in FIG. 7, optionally, the above-mentioned second data center heat exchanger 62 can include an evaporator 621, a compressor 622, a condenser 623 and a throttle valve 624, and the second cooling loop can include a third cooling loop formed by connecting the evaporator 621, the compressor 622, the condenser 623 and the throttle valve 624 in sequence, and a fourth cooling loop formed by the condenser 623 and the first heat exchange module 1; the first controller 63 is connected with the compressor 622 and/or the throttle valve 624 in the second data center heat exchanger 62.

Among them, the third cooling loop is a heat absorption and heat transferring path, the cooling medium in the third cooling loop absorbs the heat of the cooling medium of the first temperature, and the heat is transferred to the fourth cooling loop through the condenser 623. During the operation of the third cooling loop, low-pressure liquid cooling medium in the evaporator 621 takes away the heat of the cooling medium of the first temperature, and becomes a high-temperature and high-pressure cooling medium to the condenser 623 after being pressurized and enthalpy increased by the compressor 622, the condenser 623 absorbs the heat of the high-temperature and high-pressure cooling medium and then transfers the heat to the fourth cooling loop, at the same time, the cooling medium becomes low-temperature and low-pressure cooling medium after passing through the condenser 623 and the throttle valve 624 to absorb the heat from the cooling medium of the first temperature again. The fourth cooling loop can be configured to transfer the absorbed heat into the system for utilizing waste heat of data center, thereby realizing waste heat reuse. During the operation of the fourth cooling loop, the heat absorbed by the condenser 623 flows through the first heat exchange module 1 with the cooling medium in the fourth cooling loop, and the heat is transferred to the heat supply flow path 5 through the first heat exchange module 1, which is directly configured for heat supply, or transferred to the heat storage and extraction flow path 3 for storage.

Optionally, the cooling medium outlet of the data center 60 can be an air outlet, the cooling medium inlet of the data center 60 can be an air inlet, and the first data center heat exchanger 61 can be an air-to-air heat exchanger, which may include a cooling fan, and the first controller 63 is connected with the cooling fan of the air-to-air heat exchanger. The first controller 63 can control a rotation speed of the cooling fan, the faster the rotation speed of the cooling fan or the larger the air intake volume, the greater the air-to-air heat exchanger's ability to perform heat exchanging and cooling for the air at the air outlet, the more heat it can take away, and the less heat is taken away or absorbed by the second data center heat exchanger 62; on the contrary, the lower the rotation speed of the cooling fan or the smaller the air intake volume, the smaller the air-to-air heat exchanger's ability to perform heat exchanging and cooling for the air at the air outlet, the less heat it can take away, and the more heat is taken away or absorbed by the second data center heat exchanger 62.

Based on the above-mentioned content, it can be seen that the heat supply demand of the system for utilizing waste heat of data center will fluctuate depending on the time, for example, it may fluctuate in different seasons or at different time points on the same day, by the method of controlling the heat exchanging ratio of the first data center heat exchanger 61 and the second data center heat exchanger 62, the data center heat dissipation system 6 can be able to adapt to the fluctuation situation, and the continuous and stable heat dissipation demand of the data center can be ensured. Considering that the first data center heat exchanger 61 and the second data center heat exchanger 62 are at a front end of the process of the data center heat dissipation system 6, in the case where front-end heat dissipation parameters are frequently changed, back-end heat dissipation parameters will also be changed accordingly, as a result, the parameters that need to be changed in the system increase and change frequently. Therefore, the method of controlling the heat exchanging ratio of the first data center heat exchanger 61 and the second data center heat exchanger 62 through the first controller 63 is relatively more suitable for the situation where the heat supply demand of the system for utilizing waste heat of data center fluctuates greatly, for example, it is controlled by seasons. Therefore, in order to further improve the stability of the data center heat dissipation system 6, a cooling tower 64 can be arranged in the second cooling loop, the cooling tower 64 is configured to adapt to heat supply demand fluctuation situation of the system for utilizing waste heat of data center in a short period of time or the situation where the heat supply demand of the system for utilizing waste heat of data center relatively fluctuates less, which further ensures continuous and stable heat dissipation of the data center.

Among them, in the case where the heat supply demand of the system for utilizing waste heat of data center is small, the heat transferred by the data center heat dissipation system 6 to the system for utilizing waste heat of data center through the first heat exchange module 1 decreases, so that the temperature of the cooling medium after passing through the first heat exchange module 1 is relatively high, and the cooling tower 64 is arranged to cool down the high-temperature cooling medium passing through the first heat exchange module 1, so that the cooled cooling medium can meet the heat dissipation demand of the subsequent data center. In this case, the flow path of the cooling medium in the third cooling loop is the first cooling flow path, that is, after passing through the first heat exchange module 1, the high-temperature cooling medium in the third cooling loop enters the cooling tower 64 for cooling and heat dissipation to obtain a low-temperature cooling medium, and then be sent to the second data center heat exchanger 62 for absorbing the heat in the second cooling loop.

In the case where the heat supply demand of the system for utilizing waste heat of data center is large, the heat taken away by the first heat exchange module 1 increases, so that the temperature of the cooling medium after passing through the first heat exchange module 1 is relatively low, and the low-temperature cooling medium can be directly used for heat exchanging in the second data center heat exchanger 62, in this case, the flow path of the cooling medium in the third cooling loop is a second cooling flow path, that is, the low-temperature cooling medium in the third cooling loop is directly sent to the second data center heat exchanger 62 for absorbing the heat in the second cooling loop after passing through the first heat exchange module 1.

There are many methods for the first heat exchange module 1 to selectively open the first cooling flow path or the second cooling flow path in the second cooling loop. In some embodiments, a three-port valve 65 can be used to conduct, in this case, the second cooling loop can further include a three-port valve 65, the first cooling flow path can be a flow path through the first heat exchange module 1, the port A of the three-port valve 65, the port B of the three-port valve 65, the cooling tower 64 and the flow path of the second data center heat exchanger 62 in sequence. The cooling medium in the second cooling loop passing through the first heat exchange module 1 enters into the three-way valve 65 from the port A of the three-way valve 65, in the case where the first cooling flow path needs to be opened, then the cooling medium flows out from the port B of the three-way valve 65, and then flows through the cooling tower 64 and the second data center heat exchanger 62. In the case where the second cooling flow path needs to be opened, then the cooling medium flows out from the port C of the three-way valve 65, and directly enters into the second data center heat exchanger 62.

As illustrated in FIG. 6, optionally, the second cooling loop may further include a cooling tower 64, and the first heat exchange module 1 can selectively open the first cooling flow path or the second cooling flow path in the second cooling loop, the first cooling flow path is a flow path that passes through the first heat exchange module 1, the cooling tower 64 and the second data center heat exchanger 62 in sequence, and the second cooling flow path is a flow path that passes through the heat exchanger 11 of the first heat exchange module 1 and a flow path of the second data center heat exchanger 62 in sequence. The data center heat dissipation system 6 may further include a second controller and a heat exchanging temperature sensor arranged at the outlet of the first heat exchange module 1 in the second cooling loop, the second controller is connected with the heat exchanging temperature sensor; the second controller is configured to control the temperature of the cooling medium in the second cooling loop detected by the heat exchanging temperature sensor, and control the first heat exchange module 1 to open the first cooling flow path or the second cooling flow path.

In the above-mentioned embodiment, after detecting the temperature of the first heat exchanger 11 of the first heat exchange module 1 at the outlet of the second cooling loop, the heat exchanging temperature sensor can transmit temperature information to the second controller, the second controller can control the first heat exchange module 1 to open the first cooling flow path or the second cooling flow path according to the temperature information, that is to say, the second controller can determine whether the temperature of the cooling medium passing through the first heat exchanger 11 of the first heat exchange module 1 meets the requirements according to the temperature information detected by the heat exchanging temperature sensor, in the case where it does not meet the requirements, the cooling medium in the second cooling loop is the high-temperature cooling medium, and the first cooling path can be closed; in the case where it meets the requirements, the cooling medium in the second cooling loop is the low-temperature cooling medium, and the second cooling flow path can be opened. By adopting the above-mentioned method, the flow path of the cooling medium in the second cooling loop after passing through the first heat exchanger 11 can be automatically selected through the cooperation of the heat exchanging temperature sensor and the second controller, thereby avoiding manual operation and reducing the difficulty of manual operation caused by time uncertainty and environmental conditions.

As illustrated in FIG. 8, optionally, the second cooling loop may further include a phase changing heat storage water tank 66, and the first heat exchange module 1 can selectively open a third cooling flow path in the second cooling loop or the second cooling flow path, the third cooling flow path is a flow path that passes through the first heat exchange module 1, the phase changing heat storage water tank 66 and the second data center heat exchanger 62 in sequence, and the second cooling flow path is a flow path that passes through the first heat exchange module 1 and the second data center heat exchanger 62 in sequence, and the phase changing heat storage water tank 66 is connected with the system for utilizing waste heat of data center. The phase changing heat storage water tank 66 can absorb and store the heat of the cooling medium in the second cooling loop by generating a phase changing in the internal medium.

Combining the above-mentioned content again, it can be seen that the heat supply demand of the system for utilizing waste heat of data center may have some fluctuations depending on the time, for example, it may fluctuate at different time points on the same day, in addition, although the overall heat dissipation demand of the data center is relatively stable, some differences may still exist at different time periods of the day, for example, the heat dissipation demand during a non-working time period at night is smaller than the heat dissipation demand during a working time period during one day, which results in some fluctuations in the heat generated by the data center. However, the fluctuations in heating demand of the system for utilizing waste heat of data center are not completely consistent with the fluctuations in heat generated by the data center, and a time difference may exist, that is, during one day, the time period when the data center generates more heat (working time period during the day) does not coincide with the time period when the system for utilizing waste heat of data center has a large heat supply demand (time periods such as evening or morning), that is, at some certain time periods, the heat generated by the data center is still surplus after being exchanged to the system for utilizing waste heat of data center for utilization, however, in other time periods, the heat generated by the data center may be insufficient in the case where the heat is exchanged to the system for utilizing waste heat of data center for utilization. Therefore, in order to further meet the stable heat dissipation demands of the data center and meet the heat supply demands of the system for utilizing waste heat of data center, a phase changing heat storage water tank can be arranged in the second cooling loop, and the phase changing heat storage water tank can be used to store excessive heat during the day and other periods, and in the evening or morning when less heat is generated, the stored excessive heat can be used for the system for utilizing waste heat of data center to balance the fluctuations in the heat supply demand of the system for utilizing waste heat of data center and the fluctuations in the heat generated by the data center in a short period of time, which further ensures the continuous and stable heat dissipation of the data center and meets the heat supply demands of the system for utilizing waste heat of data center that changes over time.

In the case of replacing the cooling tower with a phase changing heat storage water tank, in some embodiments, the heat dissipation system may include a second controller and a heat exchanging temperature sensor that is arranged in the first heat exchange module 1 at the outlet of the second cooling loop, and the second controller is connected with the heat exchanging temperature sensor.

In addition, the embodiment of the present disclosure further provides a heat dissipation method that can be applied to the data center heat dissipation system in any of the previous embodiments, referring to FIG. 9, the heat dissipation method includes:

S910: obtaining a heat supply demand of the system for utilizing waste heat of data center and temperature information of the cooling medium at the cooling medium outlet of the data center.

S920: according to the heat supply demand of the system for utilizing waste heat of data center and the temperature information, controlling a heat exchanging ratio of the first heat exchanger and the second heat exchanger respectively by the first controller.

Among them, the heat supply demand of the system for utilizing waste heat of data center can express the heat information required by the system for utilizing waste heat of data center, and the temperature information of the cooling medium at the cooling medium outlet of the data center can express the total heat information generated by the data center, therefore, in the case where the required heat information of the system for utilizing waste heat of data center and the total heat information generated by the data center are obtained, the heat exchanging ratio of the first heat exchanger and the second heat exchanger respectively can be controlled by the first controller.

The invention claimed is:

1. A system for utilizing waste heat of data center, comprising a first heat exchange module, a second heat exchange module, a heat storage and extraction flow path, a heat supply flow path and at least one buried pipe;
   wherein the first heat exchange module is configured to connect with a data center heat dissipation system for dissipating heat of a data center, both the heat storage and extraction flow path and the heat supply flow path are connected with the first heat exchange module, so that the first heat exchange module is capable of transferring heat generated by the data center and absorbed by the data center heat dissipation system to the heat supply flow path and/or the heat storage and extraction flow path;
   the second heat exchange module is connected in the heat storage and extraction flow path and the heat supply flow path, so that the heat storage and extraction flow path is capable of exchanging heat with the heat supply flow path;
   the at least one buried pipe is arranged in the heat storage and extraction flow path, and the at least one buried pipe is configured to be buried below a ground surface and store the heat transferred by the data center heat dissipation system to the heat storage and extraction flow path into soil below the ground surface, or transfer heat stored in the soil below the ground surface to the heat supply flow path through the second heat exchange module.

2. The system for utilizing waste heat of data center according to claim 1, wherein the first heat exchange module comprises a first heat exchanger, a second heat exchanger, a third heat exchanger, a first flow path that is capable of being selectively opened or closed, and a second flow path that is capable of being selectively opened or closed;
   both a first inlet of the first heat exchanger and a first outlet of the first heat exchanger are configured to connect with the data center heat dissipation system, and a second outlet of the first heat exchanger is connected with a first inlet of the second heat exchanger through the first flow path, and the second outlet of the first heat exchanger is connected with a first inlet of the third heat exchanger through the second flow path; both a first outlet of the second heat exchanger and a first outlet of the third heat exchanger are connected with a second inlet of the first heat exchanger;
   both a second outlet of the second heat exchanger and a second inlet of the second heat exchanger are located in the heat storage and extraction flow path;
   both a second outlet of the third heat exchanger and a second inlet of the third heat exchanger are connected with the heat supply flow path.

3. The system for utilizing waste heat of data center according to claim 2, wherein a first switching valve is arranged on the first flow path, and a second switching valve is arranged on the second flow path; or,
   the first heat exchange module further comprises a first three-port valve, and a port A of the first three-port valve is connected with the second outlet of the first heat exchanger, and a port B of the first three-port valve is connected with the first inlet of the second heat exchanger, a port C of the first three-port valve is connected with the first inlet of the third heat exchanger, and the first flow path is a flow path connecting the second outlet of the first heat exchanger, the port A of the first three-port valve, the port B of the first three-port valve and the first inlet of the second heat exchanger, the second flow path is a flow path connecting the second outlet of the first heat exchanger, the port A of the first three-port valve, the port C of the first three-port valve and the first inlet of the third heat exchanger.

4. The system for utilizing waste heat of data center according to claim 2, wherein the first heat exchange module further comprises a first water pump, the first water pump is arranged on both the first flow path and the second flow path, or, both the first outlet of the second heat exchanger and the first outlet of the third heat exchanger are connected with an inlet of the first water pump, and an outlet of the first water pump is connected with the second inlet of the first heat exchanger.

5. The system for utilizing waste heat of data center according to claim 4, wherein the heat storage and extraction flow path is further provided with a second water pump, the second heat exchange module comprises a fourth heat exchanger, and the fourth heat exchanger is simultaneously arranged on the heat storage and extraction flow path and the heat supply flow path, a first inlet of the fourth heat exchanger is connected with an outlet of the buried pipe, a first outlet of the fourth heat exchanger is connected with an inlet of the buried pipe, both a second inlet of the fourth heat exchanger and a second outlet of the fourth heat exchanger are connected with the heat supply flow path.

6. The system for utilizing waste heat of data center according to claim 5, wherein the heat supply flow path comprises a first trunk path, a second trunk path, a first branch path that is capable of being selectively opened or closed, and a second branch path that is capable of being selectively opened or closed;
   an outlet of the first trunk path is connected with the second inlet of the third heat exchanger through the first branch path, and the outlet of the first trunk path is connected with the second inlet of the fourth heat exchanger through the second branch path, both the second outlet of the third heat exchanger and the second outlet of the fourth heat exchanger are connected with an inlet of the second trunk path.

7. The system for utilizing waste heat of data center according to claim 6, wherein a third switching valve is arranged in the first branch path, and a fourth switching valve is arranged in the second branch path; or, the heat supply flow path is provided with a second three-port valve, a port A of the second three-port valve is connected with the outlet of the first trunk path, a port B of the second three-port valve is connected with the second inlet of the third heat exchanger, a port C of the second three-port valve is connected with the second inlet of the fourth heat exchanger, and the first branch path is a branch path connecting the outlet of the first trunk path, the port A of the second three-port valve, the port B of the second three-port valve and the second inlet of the third heat exchanger, the second branch path is a branch path connecting the outlet of the first trunk path, the port A of the second three-port valve, the port C of the second three-port valve and the second inlet of the fourth heat exchanger.

8. The system for utilizing waste heat of data center according to claim 1, wherein the system for utilizing waste heat of data center further comprises at least two temperature sensors, the at least two temperature sensors are configured to be buried in the soil outside the at least one buried pipe and for detecting a temperature of the soil, distances between the at least two temperature sensors and a buried region where the at least one buried pipe is located are different.

9. The system for utilizing waste heat of data center according to claim 1, wherein the buried pipe is constructed as a U-shaped heat exchanging pipe extending in a depth direction of the soil.

10. The system for utilizing waste heat of data center according to claim 1, a plurality of buried pipes are provided, and the plurality of buried pipes are connected in series or in parallel with each other in the heat storage and extraction flow path.

11. The system for utilizing waste heat of data center according to claim 1, wherein the buried pipe is buried at a position greater than or equal to 200 meters and less than or equal to 300 meters below the ground surface.

12. The system for utilizing waste heat of data center according to claim 1, wherein the heat supply flow path is a flow path configured for connecting with a municipal heat supply network, or, the heat supply flow path is a flow path in the municipal heat supply network.

13. The system for utilizing waste heat of data center according to claim 1, wherein the data center heat dissipation system comprises:
a first data center heat exchanger;
a second data center heat exchanger; and
a first controller, connected with the first data center heat exchanger and the second data center heat exchanger, and configured to control a heat transferring ratio between the first data center heat exchanger and the second data center heat exchanger,
the first data center heat exchanger and the second data center heat exchanger are configured to form a first cooling loop with a cooling medium outlet of the data center and a cooling medium inlet of the data center, the second data center heat exchanger and the first heat exchange module form a second cooling loop.

14. The system for utilizing waste heat of data center according to claim 13, wherein the second cooling loop comprises a third cooling loop formed by connecting an evaporator, a compressor, a condenser and a throttle valve in sequence.

15. The system for utilizing waste heat of data center according to claim 14, wherein the second cooling loop further comprises a fourth cooling loop formed by the condenser and the first heat exchange module.

16. The system for utilizing waste heat of data center according to claim 14, wherein the first controller is connected with the compressor and/or the throttle valve in the second data center heat exchanger.

17. The system for utilizing waste heat of data center according to claim 13, wherein the second cooling loop further comprises a cooling tower, the cooling tower is configured to cool down a high-temperature cooling medium passing through the first heat exchange module.

18. The system for utilizing waste heat of data center according to claim 13, wherein the second cooling loop further comprises a phase changing heat storage water tank, configured to absorb and store heat of a cooling medium in the second cooling loop by generating a phase changing in internal medium of the phase changing heat storage water tank.

19. The system for utilizing waste heat of data center according to claim 18, wherein the first heat exchange module is configured to selectively open a first cooling flow path in the second cooling loop or a second cooling flow path, the first cooling flow path is a flow path that passes through the first heat exchange module, the phase changing heat storage water tank and the second data center heat exchanger in sequence, and the second cooling flow path is a flow path that passes through the first heat exchange module and the second data center heat exchanger in sequence.

* * * * *